United States Patent
Sundararajan et al.

(10) Patent No.: US 8,150,926 B2
(45) Date of Patent: Apr. 3, 2012

(54) ORGANIZING ELECTRONIC MAIL MESSAGES INTO CONVERSATIONS

(75) Inventors: Narasimhan Sundararajan, Redmond, WA (US); Jason C. Mayans, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 10/937,521

(22) Filed: Sep. 9, 2004

(65) Prior Publication Data

US 2006/0085502 A1  Apr. 20, 2006

(51) Int. Cl.
*G06F 15/16* (2006.01)
(52) U.S. Cl. .................................... 709/206
(58) Field of Classification Search .................. 709/206
See application file for complete search history.

(56) References Cited

U.S. PATENT DOCUMENTS

| | | | |
|---|---|---|---|
| 5,555,346 A | 9/1996 | Gross | |
| 6,101,531 A * | 8/2000 | Eggleston et al. | 709/206 |
| 6,330,589 B1 | 12/2001 | Kennedy | |
| 6,525,747 B1 | 2/2003 | Bezos | |
| 6,990,513 B2 | 1/2006 | Belfiore | |
| 7,162,473 B2 | 1/2007 | Dumais | |
| 2001/0042098 A1 * | 11/2001 | Gupta et al. | 709/206 |
| 2002/0099777 A1 * | 7/2002 | Gupta et al. | 709/206 |
| 2002/0188689 A1 | 12/2002 | Micahel | |
| 2003/0154248 A1 * | 8/2003 | Smith et al. | 709/204 |
| 2003/0158903 A1 | 8/2003 | Rohall et al. | |
| 2003/0163537 A1 * | 8/2003 | Rohall et al. | 709/206 |
| 2004/0083269 A1 | 4/2004 | Cummins | |
| 2004/0088359 A1 * | 5/2004 | Simpson | 709/206 |
| 2004/0117736 A1 | 6/2004 | Newman | |
| 2004/0128356 A1 * | 7/2004 | Bernstein et al. | 709/206 |
| 2004/0260756 A1 * | 12/2004 | Forstall et al. | 709/200 |
| 2004/0267701 A1 * | 12/2004 | Horvitz et al. | 707/2 |
| 2005/0108402 A1 * | 5/2005 | Colson et al. | 709/227 |
| 2005/0223061 A1 * | 10/2005 | Auerbach et al. | 709/206 |
| 2005/0262203 A1 * | 11/2005 | Buchheit et al. | 709/206 |
| 2006/0053204 A1 | 3/2006 | Sundararajan | |

OTHER PUBLICATIONS

Reed, Darren, "'Making Conversation': Sequential Integrity and the Local Management of Interaction on Internet Newsgroups", Proceedings of the 34th Hawaii International Conference on System Sciences—2001, Jan. 2001, 10 pages.
Office Action mailed Oct. 10, 2007 cited in related U.S. Appl. No. 10/973,547.
Comer, Douglas E., et al. "Conversation-Based Mail", ACM Transactions on Computer Systems, vol. 4, No. 4, Nov. 4, 1986.
Office Action dated Jul. 9, 2008 cited in related U.S. Appl. No. 10/973,547. Office Action dated Dec. 16, 2008 cited in U.S. Appl. No. 10/973,547.
Office Action dated Jun. 29, 2009 cited in U.S. Appl. No. 10/973,547.
U.S. Appl. No. 10/973,547, Mail Date Jan. 19, 2010, Office Action.
U.S. Appl. No. 10/973,547, Mail Date Jun. 30, 2011, Office Action.

\* cited by examiner

*Primary Examiner* — John Macilwinen
(74) *Attorney, Agent, or Firm* — Workman Nydegger

(57) ABSTRACT

The present invention extends to methods, systems, data structures, and computer program products for organizing electronic mail messages into conversations. Electronic mail conversation items store attribute values representing attributes of corresponding electronic mail conversations and included electronic mail messages. Attributes of an electronic mail conversation can be changed by changing stored attribute values. Receiving an electronic mail message can cause an existing electronic mail conversation to be updated or a new electronic mail conversation to be created. When it is indicated that an operation is to be performed on an electronic mail conversation, a corresponding related operation can be performed on all electronic mail messages included in the electronic mail conversation. Attribute values of an electronic mail conversation can be presented along with portions of included electronic mail messages at a user-interface.

42 Claims, 7 Drawing Sheets

ORGANIZING ELECTRONIC MAIL MESSAGES INTO CONVERSATIONS

CROSS-REFERENCE TO RELATED APPLICATIONS

Not applicable.

BACKGROUND OF THE INVENTION

1. The Field of the Invention

The present invention relates to electronic messages and, more particularly, to organizing electronic mail messages into conversations.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In particular, electronic mail has become an important method for communicating. To create an electronic mail message, a sending user typically manipulates input devices, such as a keyboard and mouse, within an electronic mail application to enter data (e.g. text and attachments) into the electronic mail message. The sending user also typically includes an electronic mail address of a recipient user in the electronic message, for example, by entering text in the "To" field. The sending user then sends the electronic mail message to the recipient user by selecting a "Send" control within the electronic mail application. Sending the electronic message can cause the electronic mail message to be routed from the sending user's computer system, through one or more intermediate mail servers, to a destination mail server that stores electronic mail messages for the recipient user (e.g., in accordance with the Simple Mail Transfer Protocol ("SMTP").

To access the electronic mail message, the recipient user establishes a connection from an electronic mail application (at the recipient user's computer system) to the receiving mail server (e.g., in accordance with the Post Office Protocol ("POP") or Internet Message Access Protocol ("IMAP")). The electronic mail message is downloaded over the connection and can be presented at the recipient user's computer system.

Due to quantity of electronic mail messages that entities receives, various mechanisms for organizing electronic mail messages have been developed. Typically, mail servers maintain one or more mail folders (e.g., inbox, outbox, sent items, SPAM, or user-defined folders) for each electronic mail user. Electronic mail messages can be transferred to different folders (either automatically or in response to user input) based on the message contents, user-created rules, or default server rules. For example, when an electronic mail message is sent to recipient user, the electronic mail message by default can be me moved to a "Sent Items" folder. Alternately, a recipient user, after receiving an electronic mail message from a family member, can manually transfer the received electronic mail message to a user-defined "Family" folder. In some environments, electronic mail rules can automatically move or copy an electronic mail message to a particular folder.

Using folders, an electronic mail user can access groups of electronic mail messages that have various similar characteristics. For example, an electronic mail user can access an "Inbox" folder to access received electronic messages or can access a "Family" to access electronic messages related to the electronic mail user's family.

In some environments, electronic mail users exchange a set of electronic mail messages that are part of the same "conversation." For example, co-workers may exchange a set of electronic messages related to specified topic (e.g., where to go to lunch). Unfortunately, typical electronic mail applications are individual message centric. Thus, it may be difficult for one co-worker to identify that a number of individual messages from one or more other co-workers are all related to the specified topic and/or are part of the same conversation.

Some electronic mail applications loosely relate electronic message to one another such that the electronic messages can be presented at a user-interface as being part of the same conversation. For example, some electronic mail applications append a conversation index and/or conversation ID to electronic mail messages to identify a conversation and/or a position within the conversation. In some environments, specified electronic mail message headers can be used to identify relationships between electronic messages. For example, Request For Comments ("RFC") 2822 "In-Reply-To" and "References" headers can be used to identify that an electronic mail message is related to one or more other electronic mail messages.

However, while electronic message headers and appended conversation IDs can be utilized to group electronic message for presentation, typical electronic mail applications do not create or maintain additional conversation specific data. For example, existing electric mail applications do not link electronic mail messages to a specified conversation item. Thus, presentation of a conversation view requires a user-interface to scan electronic mail messages in a folder for conversation IDs and/or message headers. Based on the scanned conversation IDs and/or message headers, the user-interface re-constructs a conversation tree the scanned messages. Unfortunately, the lack of conversation specific data also limits electronic mail message identification to electronic messages that are included in the same folder. That is, typical electronic mail applications can not identify electronic messages in different folders (e.g., in an "Inbox" folder and a "Sent Items" folder) as being part of the same conversation. Thus, presented conversation views of electronic messages are often incomplete.

Further, in part due to the lack of conversation specific data and inability to otherwise identify all the electronic mail messages in a conversation, there is typically no mechanism for performing an operation over all the messages that are included in a conversation. For example, it would be difficult, if not impossible, to create an electronic mail rule that automatically moves all electronic messages included a specific conversation to a specified electronic mail folder (e.g., to a SPAM or archive folder). Therefore systems, methods, data structures, and computer program products that facilitate organizing electronic mail messages into conversations would be advantageous.

BRIEF SUMMARY OF THE INVENTION

The foregoing problems with the prior state of the art are overcome by the principles of the present invention, which are directed towards methods, systems, data structures, and computer program products for organizing electronic mail messages into conversations. Electronic mail conversation items are stored on computer-readable media and store message conversation data representing attributes of corresponding electronic mail conversations. For example, electronic mail conversation items can store values that identify an electronic mail conversation, identify the participants in an electronic mail conversation, identify the most active participant in an electronic mail conversation, represent the duration of an electronic mail conversation, and identify the nesting of reply messages in an electronic mail conversation. Electronic mail conversation items can also store per message data for each electronic mail message included in a represented electronic mail conversation. Per message data can include values representing a link (e.g., a Uniform Resource Locator ("URL") to an electronic mail message (included in the electronic mail conversation) and representing any difference in recipients between the electronic mail message and a corresponding parent or otherwise related electronic mail message.

Embodiments of the present invention include updating message conversation data. A computer system receives an electronic mail message. The computer system links the received electronic mail message to a corresponding electronic mail conversation item that includes a plurality of conversation attribute values representing the attributes of an electronic mail conversation. The computer system persists the link between the received electronic mail message and the corresponding electronic mail conversation item. The computer system changes one or more conversation attribute values to appropriately reflect the attributes of the electronic mail conversation in response to receiving the received electronic mail message.

Other embodiments of the present invention include performing an electronic mail conversation operation. A computer system receives an indication that an operation is to be performed on an electronic mail conversation. The computer system identifies one or more electronic mail messages included in the electronic mail conversation. The computer accesses the identified one or more electronic mail messages included in the electronic mail conversation. The computer system performs a corresponding related operation on each of the identified one or more electronic messages in response to the received indication that the operation is to be performed on the electronic mail conversation.

Additional embodiments of the present invention include presenting message conversation data. A computer system receives a command to present message conversation data for an electronic mail conversation that includes one or more electronic mail messages. The computer system accesses an electronic mail conversation item that represents the electronic mail conversation. The computer system retrieves persisted conversation attribute values, representing the attributes of the electronic mail conversation, from the electronic mail conversation item. The computer system presents the retrieved conversation attribute values along with portions of the one or more electronic mail messages.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
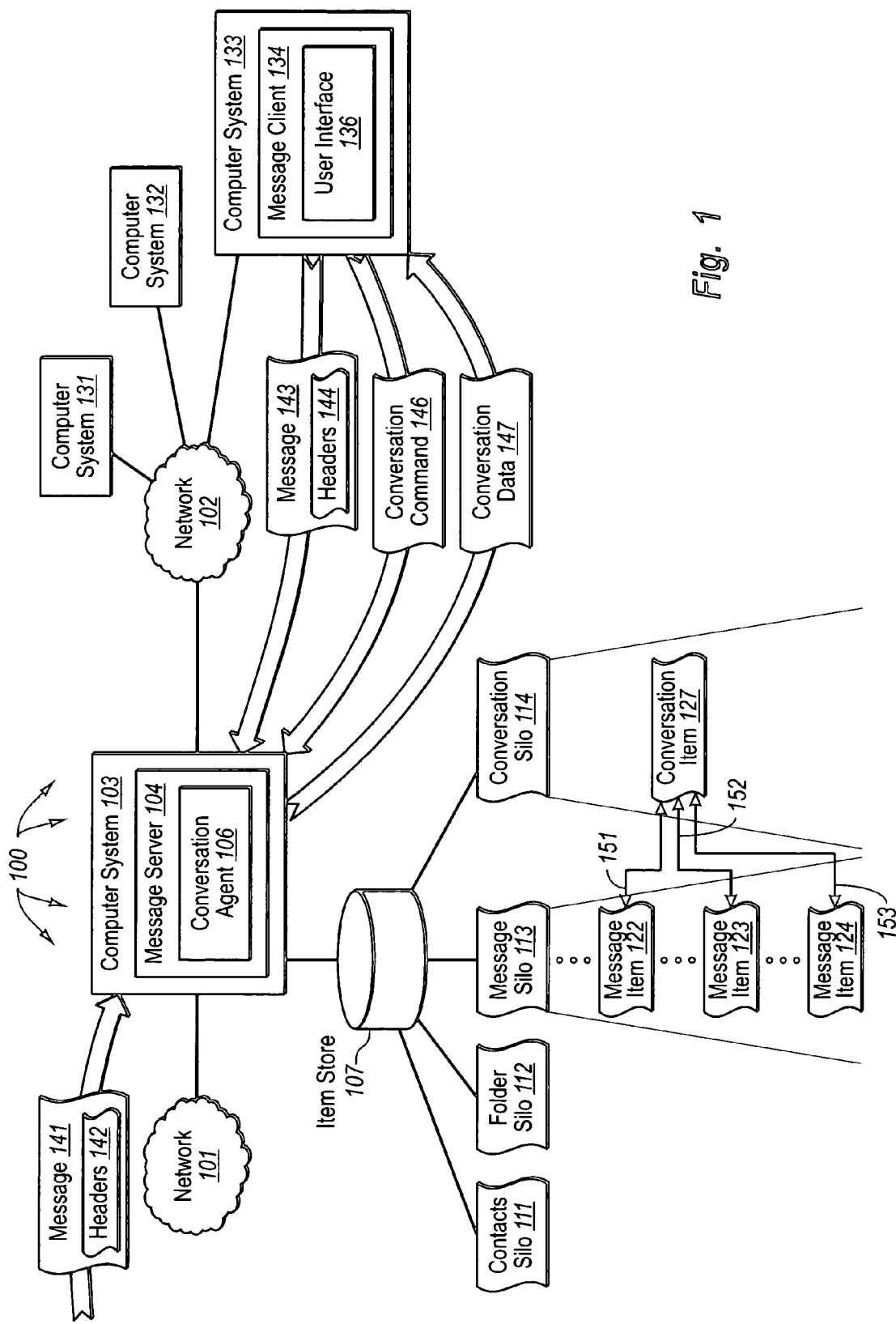
FIG. 1 illustrates an example of a computer architecture that facilitates organizing electronic mail messages into conversations.

The principles of the present invention provide for organizing electronic mail messages into conversations. Electronic mail conversation items are stored on computer-readable media and store message conversation data representing attributes of corresponding electronic mail conversations. For example, electronic mail conversation items can store values that identify an electronic mail conversation, identify the participants in an electronic mail conversation, identify the most active participant in an electronic mail conversation, represent the duration of an electronic mail conversation, and identify the nesting of reply messages in an electronic mail conversation. Electronic mail conversation items can also store per message data for each electronic mail message included in a represented electronic mail conversation. Per message data can include values representing a link (e.g., a Uniform Resource Locator ("URL") to an electronic mail message (included in the electronic mail conversation) and representing any difference in recipients between the electronic mail message and a corresponding parent or otherwise related electronic mail message.

Embodiments of the present invention include updating message conversation data. A computer system receives an electronic mail message. The computer system links the received electronic mail message to a corresponding electronic mail conversation item that includes a plurality of conversation attribute values representing the attributes of an electronic mail conversation. The computer system persists the link between the received electronic mail message and the corresponding electronic mail conversation item. The computer system changes one or more conversation attribute values to appropriately reflect the attributes of the electronic mail conversation in response to receiving the received electronic mail message.

Other embodiments of the present invention include performing an electronic mail conversation operation. A computer system receives an indication that an operation is to be performed on an electronic mail conversation. The computer system identifies one or more electronic mail messages included in the electronic mail conversation. The computer accesses the identified one or more electronic mail messages included in the electronic mail conversation. The computer system performs a corresponding related operation on each of the identified one or more electronic messages in response to the received indication that the operation is to be performed on the electronic mail conversation.

Additional embodiments of the present invention include presenting message conversation data. A computer system receives a command to present message conversation data for an electronic mail conversation that includes one or more electronic mail messages. The computer system accesses an electronic mail conversation item that represents the electronic mail conversation. The computer system retrieves persisted conversation attribute values, representing the attributes of the electronic mail conversation, from the electronic mail conversation item. The computer system presents the retrieved conversation attribute values along with portions of the one or more electronic mail messages.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "conversation" is defined as an electronic message exchange between a plurality of messaging entities related to a specified topic or subject.

FIG. 1 illustrates an example of a computer architecture 100 that facilitates organizing electronic mail messages into conversations. As depicted in computer architecture 100, computer system 103 is connected to networks 101 and 102. Network 101 can be virtually any type of network, such as, for example, a Wide Area Network ("WAN") or even the Internet. Similarly, network 102 can be virtually any type of network, such as, for example, a Local Area Network ("WAN"), Personal Area Network ("PAN"), or Home Area Network ("HAN"). Computer systems 131, 132, and 133 are also connected to network 102.

Computer systems connected to networks 101 and 102 can receive data from and send data to other computer systems that are also connected to network 101 or network 102. Accordingly, computer systems 103, 131, 132, and 133, as well as other connected computer systems (not shown), can exchange message related data (e.g., included in Internet Protocol ("IP") datagrams and in accordance with other higher layer protocols that utilize IP datagrams, such as, Transmission Control Protocol ("TCP"), Hypertext Transfer Protocol ("HTTP"), Simple Mail Transfer Protocol ("SMTP"), Post Office Protocol ("POP"), Internet Message Access Protocol ("IMAP"), etc.) over networks 101 and 102. For example, each of computer systems 103, 131, 132, and 133 can include electronic mail applications (e.g., mail servers and/or mail clients) configured to transfer and process electronic mail messages (and other message related data).

As depicted in computer architecture 100, computer system 103 includes message server 104. Generally, message server 104 can receive, forward, and store electronic messages for the users of computer systems 131, 132, and 133. Thus, message server 104 can maintain one or more mail boxes for the users of computer systems 131, 132, and 133. When an electronic message (e.g., message 141) is received (e.g., over network 101 in accordance with SMTP), message server 104 can store the electronic message in an appropriate mail box. Subsequently, a user can send a request for the electronic mail message. In response to the request, message server 104 can send the electronic message (e.g., over network 102 in accordance with POP or IMAP) to the appropriate message client (e.g., message client 134). Message clients can include a user-interface (e.g., user-interface 136) fir displaying electronic mail messages and message conversation data.

Message server 104 can also receive (e.g., over network 102 in accordance with SMTP) messages (e.g., message 143) from message clients (e.g., message client 134) for delivery to other computer systems. In response, message server 104 can forward electronic messages (e.g., over network 101 in accordance with SMTP) to other message servers.

Item store 107 generally represents a system, such as, for example, a file system, database, or electronic mail storage system, for retaining, indexing, and recalling data. Electronic messages and other message related data can be stored in item store 107. As depicted, item store 107 includes contacts silo 111, folder silo 112, message silo 113, and conversation silo 114. Contacts silo 111, folder silo 112, message silo 113, and conversation silo 114 can store corresponding message contact data (e.g., names and electronic mail addresses), message folder data (e.g., mail folders), message data (message headers and bodies), and message conversation data respectively. For example, message silo 113 includes message items 122, 123, and 124 that contain message data related to received electronic messages (e.g., message 141 and/or message 143).

Conversation silo 114 includes conversation item 127. Generally, conversation item 127 is a physical representation of an electronic mail conversation and has a set of attributes that represent the electronic mail conversation. Links 151, 152, and 153 link conversation item 127 to messages items 122, 123, and 124, respectively. Thus, message items 122, 123, and 124 can be viewed as being included in an electronic mail conversation represented by conversation item 127.

Conversation agent 106 acts upon received messages to create, update and delete message conversation data, such as, for example, message conversation meta-data on electronic mail conversations and electronic mail messages included in electronic mail conversations. In some embodiments, conversation agent 106 maintains a "conversations" folder in a user's mailbox. Thus, conversation items may be created, updated, and deleted by interfacing with the conversations folder.

When an electronic mail message (e.g., message 141 or 143) is received, conversation agent 106 can determine if the received mail message is to be included in an existing electronic mail conversation (e.g., that already includes one or more other electronic mail messages) or it the received mail messages is to be included in a new electronic mail conversation. In response to a received electronic mail message, conversation agent 106 can change values included in stored message items stored and conversation items (and possibly other data in item store 107).

Conversation agent 106 can utilize data included in a received message to determine the appropriate electronic mail conversation an electronic mail message is to be included in can utilize. For example, conversation agent 106 can parse header data to determine if a received electronic message includes any message conversation data. In some environments, an electronic mail message includes message conversation data, such as, for example, a conversation index or conversation GUID, indicative of a specific conversation. Accordingly, conversation agent 106 can determine the appropriate electronic mail conversation based on the conversation index or conversation GUID.

In other environments, an electronic mail message does not include message conversation data indicative of a specified conversation. Thus, conversation agent 106 can identify a specified electronic mail conversation from other message conversation data included in the electronic mail message. For example, conversation agent 106 can examine the values of one or more message headers (e.g., Request For Comments ("RFC") 2822 "In-Reply-To" and/or "References" headers) to identify an appropriate electronic mail conversation. Conversation agent 106 can scan other message items in message silo 113 to attempt to identify a parent or otherwise related electronic message for the received electronic message. When a parent or related message is identified, the received message can be included in the electronic mail conversation that includes the parent or related electronic mail message.

Although conversation agent 106 is depicted at message server 104, it should be understood that conversation agent 106 (or some other conversation agent) can be included at any computer system to organize electronic mail messages into conversations. For example, a conversation agent can be included at any of computer systems 131, 132, and 133, such as, for example, as part of message client 134. Thus, it would be apparent to one skilled in the art, after having reviewed this description, that a conversation agent can be included at any number of computer systems, in addition to computer system 103. Conversation related commands (e.g., conversation command 146) and corresponding responses (e.g., conversation data 147) can be transferred between a conversation agent and an item store in a distributed manner. Accordingly, electronic mail conversations can be modeled as first class entities and conversation items can be physically persisted in Item store 107.

Figure 2:
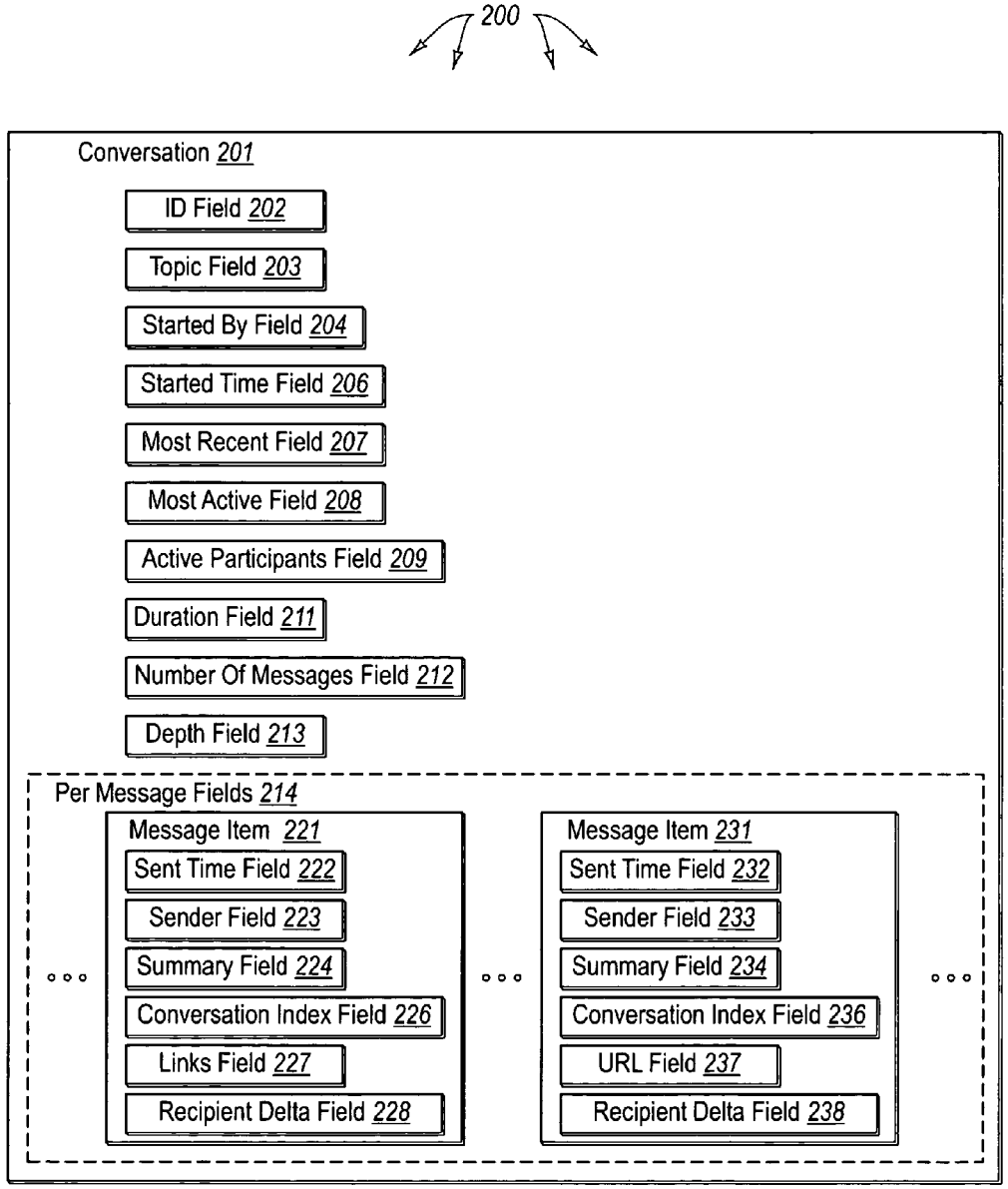
FIG. 2 illustrates an example data structure representing an electronic mail conversation item.

FIG. 2 illustrates an example data structure 200 representing conversation item 201. Data structure 200 is one example of a data structure that can be manipulated by conversation agent 106. Conversation item 127 can be structured in accordance with data structure 200. Data structure 200 can be virtually any type of data or data stream, such as, for example, an eXstensible Mark-up Language ("XML") data stream. Each field in conversation item 201 can be typed to store a particular type of data, such as, for example, integer, string, character, floating point, hexadecimal, octal, binary, logical, URL, or even user-defined. Within conversation item 201, each of the depicted data fields can store one or more attribute values representing and/or identifying one or more attributes of a corresponding electronic mail conversation.

ID field 202 can store an identifier value (e.g., a GUID) that identifies an electronic mail conversation. Topic field 203 can store a topic value representing the topic of the electronic mail conversation identified by the identifier value in ID field 202. Started By field 204 can store a started by value that identifies the entity (e.g., by name and/or electronic mail address) that started the electronic mail conversation identified by the identifier value in ID field 202. Start Time field 206 can store a start time value representing the time the electronic mail conversation identified by the identifier value in ID field 202 was started. Most recent field 207 can store a most recent value identifying the entity (e.g., by name and/or electronic mail address) that most recently sent an electronic mail message included in the electronic mail conversation identified by the identifier value in ID field 202.

Most Active field 208 can store a most active value identifying an entity (e.g., by name and/or electronic mail address) that has contributed the most number of electronic mail messages to the electronic mail conversation identified by the identifier value in ID field 202. Active Participants field 209 can store one or more active participant values that identify entities (e.g., by name and/or electronic mail address) participating in the electronic mail conversation identified by the identifier value in ID field 202. Duration field 211 can store a duration value representing the duration of the electronic mail conversation identified by the identifier value in ID field 202 (e.g., from starting electronic mail message to most recent electronic mail message). Number Of Messages field 212 can store a number of messages value representing the number of messages exchanged in the electronic mail conversation identified by the identifier value in ID field 202. Depth field 213 can store a depth value identifying the nesting of reply messages in the electronic mail conversation identified by the identifier value in ID field 202.

In addition, conversation item 201 also includes per message fields 214 corresponding to each electronic mail message (e.g., message items 122, 123, and 124) included in the electronic mail conversation identified by the identifier value in ID field 202. Per message fields 214 includes attributes for one or more message items, such as, for example, message items 221 and 231. Within each message item, depicted data fields can store one or more attribute values representing and/or identifying one or more attributes of a corresponding electronic mail message included in the electronic mail conversation identified by the identifier value in ID field 202.

Sent time fields 222 and 232 can store sent time values indicating when electronic mail messages represented by message items 221 and 222 were sent respectively. Sender fields 223 and 223 can store sender values identifying the entity (e.g., by name and/or electronic mail address) that sent the electronic mail messages represented by message items 221 and 222 respectively. Summary fields 234 and 244 can store summary values representing a summary of the contents (e.g., text) of the electronic mail messages represented by message items 221 and 222 respectively. Blindly quoted text from parent electronic mail messages can be omitted.

Conversation index fields 226 and 236 can store conversation index values identifying the appropriate position of the electronic mail messages represented by message items 221 and 222 respectively within the electronic mail conversation identified by the identifier value in ID field 202. Link fields 227 and 237 can store link values that link the electronic mail conversation identified by the identifier value in ID field 202 to the electronic mail messages represented by message items 221 and 222 respectively. In some embodiments, link fields are Uniform Resource Identifier ("URI") fields or Uniform Resource Locator ("URL") fields that store URL values or some other type of URI value.

Recipient delta fields 228 and 238 can store recipient delta values indicating the list of entities (e.g., by name and/or electronic mail address) that were added or removed from the electronic mail messages represented by message items 221 and 222 respectively relative to a corresponding parent message. For example, it may be that a parent message is sent to from entity A to entities B, C, D. In response to receiving the parent message, entity D may send a child message (e.g., a reply to the parent message) to entities A, C, E. Thus, the recipient delta value for the child message may be a list that indicates entity B was removed and entity E was added.

A series three periods (an ellipsis) before, between, and after message items 221 and 231 indicate that per message fields 214 can include one or more additional message items before, between, and after message items 221 and 231.

In some embodiments, HyperText Markup Language ("HTML") bodies are computed for conversation items such that the conversation items can be displayed at a user-interface (e.g., user-interface 136). HTML bodies can be computed using an eXstensible Style Language ("XSL") transform on the attribute values stored in the fields of conversation item 201. HTML bodies can be generated dynamically in response to a request to present a conversation item.

Figure 3:
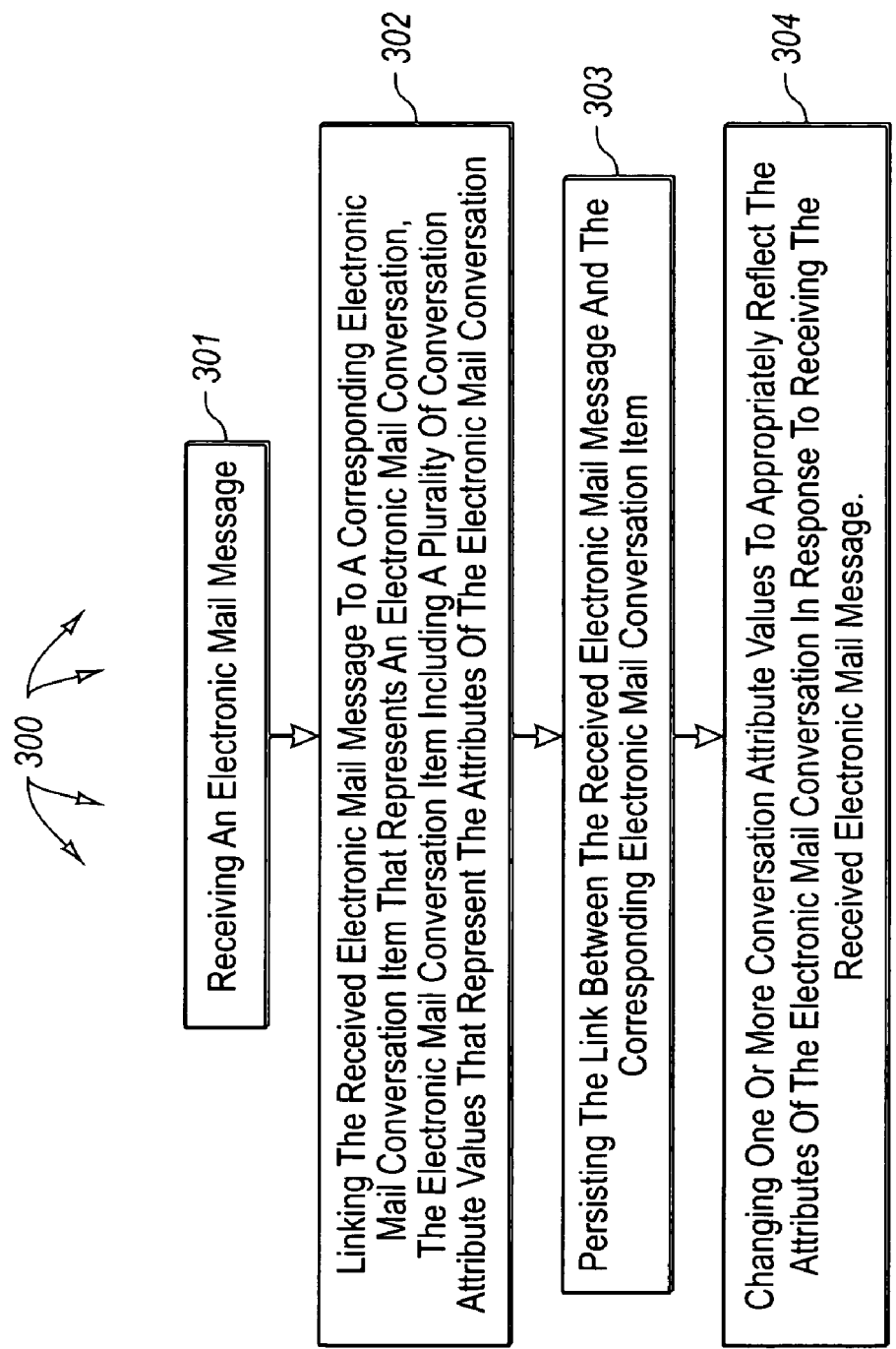
FIG. 3 illustrates an example flow chart of a method for updating message conversation data.

Conversation agent 106 (or any other conversation agent) can be configured to handle one or more message related events. In some embodiments, conversation agent 106 is configured to handle the arrival of a new electronic mail message or the update of an existing electronic mail message. FIG. 3 illustrates an example flow chart of a method 300 for updating message conversation data. The method 300 will be described with respect to the components and data in computer architecture 100 and the data fields of data structure 200.

Method 300 includes an act of receiving an electronic mail message (act 301). For example, computer system 103 can receive message 141 or message 143. Method 300 includes an act of linking the received electronic mail message to a corresponding electronic mail conversation item that represents an electronic mail conversation (act 302). For example, conversation agent 106 can create a message item (e.g., message item 122) for message 141 or message 143 in system memory. Conversation agent 106 can subsequently link conversation item 127 to the in-memory message item. Conversation item 127 can include plurality of conversation attribute fields (e.g., the fields of conversation item 201) that represent attributes of the electronic mail conversation.

Method 300 includes an act of persisting the link between the received electronic mail message and the corresponding electronic mail conversation item (act 303). For example, conversation agent 106 can store message item 122 (a message item corresponding to message 141 or message 143) in message silo 113. Link 151 can also be stored in item store 107. Thus, link 151 is more permanent. For example, after link 151 is stored in item store 107, link 151 can continue to exist after power of computer system 103 is removed. Link 151 may also continue to exist even if computer system 103 malfunctions. Accordingly, conversation item 127 can subsequently be accessed to determine that the received electronic mail message (e.g., message 141 or message 143) is included in the electronic mail conversation.

Method 300 includes an act of changing one or more conversation attribute values to appropriately reflect the attributes of the electronic mail conversation in response to receiving the received electronic mail message (act 304). For example, conversation item 106 can change one or more conversation attribute values of conversation item 127 to appropriately reflect the attributes of the electronic mail conversation in response to receiving message 141 or message 143. In some embodiments, one or more data fields similar to the data fields in conversation item 201 are updated in response to receiving an electronic message.

For a newly created conversation item, an identifier value can be set to a conversation GUID of the received electronic mail message and stored in a corresponding ID field. Also, for a newly created conversation item, a topic value can be set to the conversation topic of the received electronic mail message and stored in a corresponding Topic field. When the received electronic mail message is the first electronic mail message in an electronic mail conversation, a started by value can be set to the sender (e.g., name and/or electronic mail address) of the received electronic mail message and stored in a corresponding Started By field. Also, when the received electronic mail message is the first electronic mail message in an electronic mail conversation, a start time value can be set to the sent time of the received electronic mail message and stored in a corresponding Start Time field.

When a received electronic mail message is the most recent electronic mail message in an electronic mail conversion, a most recent value can be set to the sender (e.g., name and/or electronic mail address) of the received electronic mail message and stored in a corresponding Most Recent field. Based on the sender of the received electronic mail message, conversation agent 106 can calculate the most active participant in the electronic mail conversation. A most active value can be set to the calculated most active participant (e.g., name and/or electronic mail address) and stored in a corresponding Most Active field. Based on the sender of the received electronic mail message, conversation agent 106 can determine all the entities that have participated in the electronic mail conversation. An active participants value can be set to a list of all the entities (e.g., names and/or electronic mail addresses) and stored in a corresponding Active Participants field.

Taking the received electronic mail message into account, conversation agent 106 can calculate the elapsed time span between the earliest message in the electronic mail conversation and the latest message in the electronic mail conversion. A duration value can be set to the calculated elapsed time span and stored in a corresponding Duration field. Taking the received electronic mail message into account, conversation agent 106 can calculate the total number of electronic mail messages in the electronic mail conversation. A number of messages value can be set to the calculated total number and stored in a Number Of Messages field. Taking the received electronic mail message into account, conversation agent 106 can determine the nested reply depth of the electronic mail conversation. A depth value can be set to the determined nested reply depth and stored in a corresponding depth field.

Per message data fields can also be updated. When an electronic mail message is received, a sent time value is set to the sent time of the received electronic mail message and stored in a corresponding Sent Time field. When an electronic mail message is received, a sender value is set to the sender (e.g., name and/or electronic mail address) of the received electronic mail message and stored in a corresponding Sender field.

When an electronic mail message is received, the text body content of the received electronic mail message is obtained. If the received electronic mail message is a reply to another email, the text body is scanned to eliminate any text that is automatically "quoted" from the parent message. Eliminating automatically quoted text can be done by scanning for character patterns that indicate the start of quoted text (e.g., "--------------------", and "_____" are two such patterns). If the unique text content of received electronic mail message is larger than a threshold number (e.g., 1000 characters), then only the threshold number (e.g., 1000) of characters are retained. A summary text value is set to the unique text content and stored in a corresponding Summary field.

When an electronic mail message is received, a conversation index value is set to the conversation index attributed of the received electronic mail message and stored in a corresponding Conversation Index field. When an electronic mail message is received, a link value is set to a link (e.g., a URL) to received electronic mail message and stored in a corresponding Link field.

When an electronic mail message is received, a recipient delta value is calculated. When the received electronic mail message is not a reply to an existing electronic mail message in the electronic mail conversation, the recipient delta value is et to the simply the entire list of recipients in the receive electronic mail message. On the other hand, when the received electronic mail message has a parent electronic mail message in the electronic mail conversation, the recipient list of the received electronic mail message is compared to the receipt list of the part electronic mail message. If the recipient lists are identical, then a recipient delta value is not set. If the recipient lists are different, the actual difference that consists of both new recipients added to the received electronic mail message that are not on the parent electronic mail message, and the recipients that are absent on the received electronic mail message but present on the parent electronic mail message, are noted. The recipient delta value is set to the noted differences and stored in a corresponding Recipient Delta field.

Figure 4:
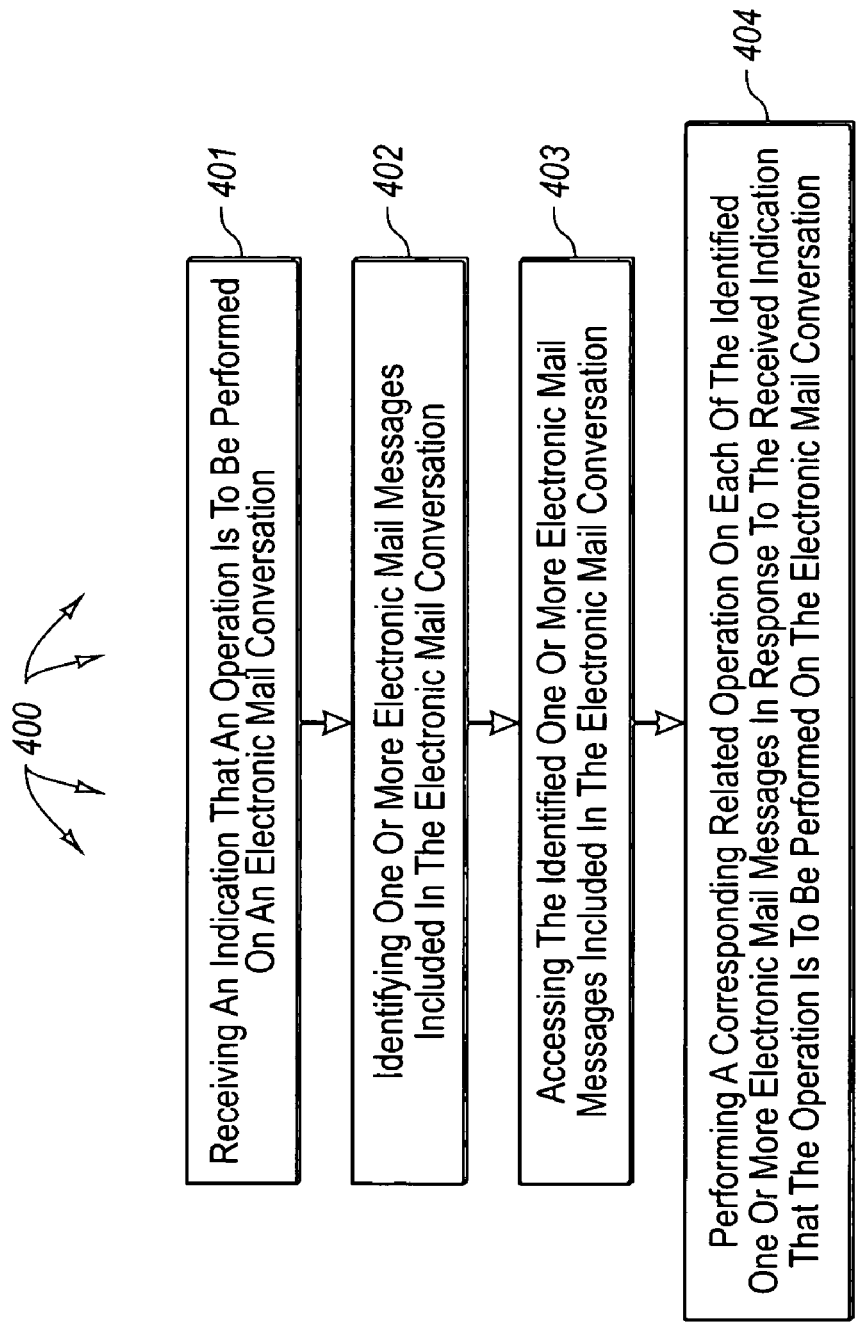
FIG. 4 illustrates an example flow chart of a method for performing an electronic mail conversation operation.

Turning now to FIG. 4, FIG. 4 illustrates an example flow chart of a method 400 for performing an electronic mail conversation operation. The method 400 will be described with respect to the components and data in computer architecture 100 and the data fields of data structure 200.

Method 400 includes an act of receiving an indication that an operation is to be performed on an electronic mail conversation (act 401). For example, computer system 103 can receive conversation command 146, such as, for example, a command to create a new conversation or open, move, or delete an existing conversation. Conversation command 146 can be a manually entered command or an automated command. For example, a user can manipulate an input device (e.g., a keyboard or mouse) to enter conversation command 146 (or data that causes conversation command 146) at user-interface 136. Alternately, conversation command 146 can be caused by an electronic mail rule or other automated process at computer system 133. A conversation command can also be generated internally at computer system 103, such as, for example, in a message processing pipeline of message server 104. In some embodiments, receiving an electronic mail message is an indication that an operation is to be performed on an electronic mail conversation.

Method 400 includes an act of identifying one or more electronic mail messages included in the electronic mail conversation (act 402). For example, conversation agent 106 can identify that electronic mail messages represented by message items 122, 123, and 124 are included in an electronic mail conversation represented by conversation item 127. Conversation agent 106 can use a GUID for identifying electronic mail messages. For example, conversation agent 106 can match GUIDs in electronic mail message headers (e.g., in headers 142 or 144) to a GUID in a conversation item (e.g., stored in ID field 202). Alternately, conversation agent 106 can scan per message fields (e.g., per message fields 214) to identify message items included in a conversation item. For example, conversation agent 106 can scan links (e.g., URLs) stored in link fields (e.g., link fields 227 and 237) to identify electronic mail messages.

Method 400 includes an act of accessing the identified one or more electronic mail messages included in the electronic mail conversation (act 403). For example, conversation agent 106 can access electronic mail messages represented by message items 122, 123, and 124. Conversation agent 106 can access electronic mail messages identified as having matching GUIDs and/or can follow links in per message fields to access electronic mail messages.

Method 400 includes an act of performing a corresponding related operation on each of the identified one or more electronic mail messages in response to the received indication that the operation is to be performed on the electronic mail conversation (act 404). For example, conversation agent 106 can cause a corresponding related operation to be performed on messages represented by message items 122, 123, and 124 in response to a received indication that the operation is to be performed on the electronic mail conversation represented by conversation item 127. Thus, issuing a command to perform an operation on an electronic mail conversation can cause a corresponding related operation to be performed on all electronic mail messages included in the electronic mail conversation.

For example, deleting an electronic mail conversation can cause all the electronic mail messages included in the electronic mail conversation to be deleted. Opening an electronic mail conversation can cause all the electronic mail messages included in the electronic mail conversation to be opened.

Moving an electronic mail conversation to a folder can cause all the electronic mail messages included in the electronic mail conversation to be moved to the same location, such as, for example, to the same folder as the electronic mail conversation or a different folder (even if the electronic mail messages are received after the conversation is moved). For example, when an electronic mail conversation is moved to a "Work" folder, conversation agent 106 scans all mail folders and identifies electronic mail messages (e.g., using a GUID) included in the electronic mail conversation. Conversation agent 106 moves all identified electronic mail messages to the Work folder. Conversation agent 106 also moves any subsequently received electronic mail messages included in the electronic mail conversation to the Work folder Alternately, when an electronic mail conversation is moved to an Ignored Conversations folder, conversation agent 106 scans all mail folders and identifies electronic mail messages (e.g., using a GUID) included in the electronic mail conversion. Conversation agent 106 moves all identified electronic mail messages to a Deleted Items folder. Conversation agent 106 also moves any subsequently received electronic mail messages include in the electronic mail conversation to the Deleted Items folder.

For example, when message 141 or message 143 is received, conversation agent 106 can check an "Ignored Conversations" folder for the presence of an existing conversation item that corresponds to the received electronic mail message (e.g., using a GUID as the key for correlation). Similar to links to message items, conversation items can also include links to folders items (e.g., in folder silo 112). A link from a conversation item to a folder item can represent that the conversation item is in a folder represented by the folder item. Thus, when a conversation item is present in the Ignored Conversations folder (e.g., when a user has expressed a preference to ignore electronic mail messages included in the electronic mail conversation), conversation agent 106 transfers the received electronic mail message to a "Deleted Items" folder (fulfilling the user's preference).

On the other hand, when a corresponding conversation item is not present in the Ignored Conversations folder, conversation agent 106 can check a "Conversations" folder for the presence of an existing conversation item that corresponds to the received electronic mail message (e.g., using the GUID). If a corresponding conversation item does not exist, a new conversation item is created in the Conversations folder. If a corresponding conversation item does exist, the existing conversation item is opened. Attribute values of the new or existing conversation item with relevant message conversation data is updated (e.g., in accordance with method 300).

Figure 5:
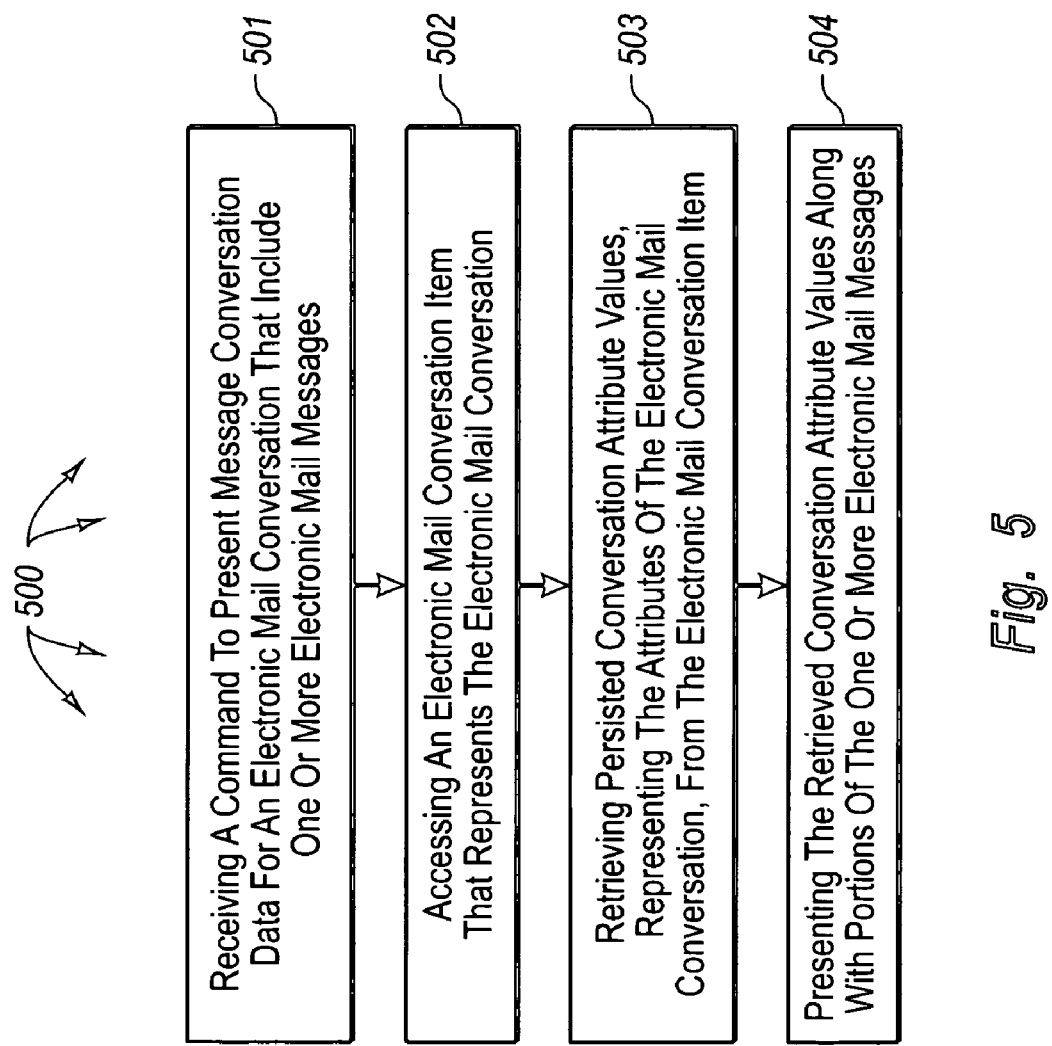
FIG. 5 illustrates an example flow chart of a method for presenting message conversation data.

Turning now to FIG. 5, FIG. 5 illustrates an example flow chart of a method for presenting message conversation data. The method 500 will be described with respect to the components and data in computer architecture 100 and the data fields of data structure 200.

Method 500 includes an act of receiving a command to present message conversation data for an electronic mail conversation that includes one or more electronic mail messages (act 501). For example, user-interface 136 can receiver user input requesting message conversation data for the electronic mail conversation represented by conversation item 127. User-input can include, for example, selecting an icon representing the electronic mail conversation or entering query data at user-interface 136. Alternately, an electronic mail rule or other automated process (at computer system 103 or computer system 133) can generate a command to present message conversation data. In some embodiments, conversation command 146 (e.g., including a GUID) is sent from computer system 133 to computer system 103.

Method 500 includes an act of accessing an electronic mail conversation item that represents the electronic mail conversation (act 502). For example, conversation agent 106 can access conversation item 127. Method 500 includes an act of retrieving persisted conversation attribute values, representing the attributes of the electronic mail conversation, from the electronic mail conversation item (act 503). For example, conversation agent 106 can retrieve one or more stored values from data fields of a data structure similar to data structure 200.

Figure 6:
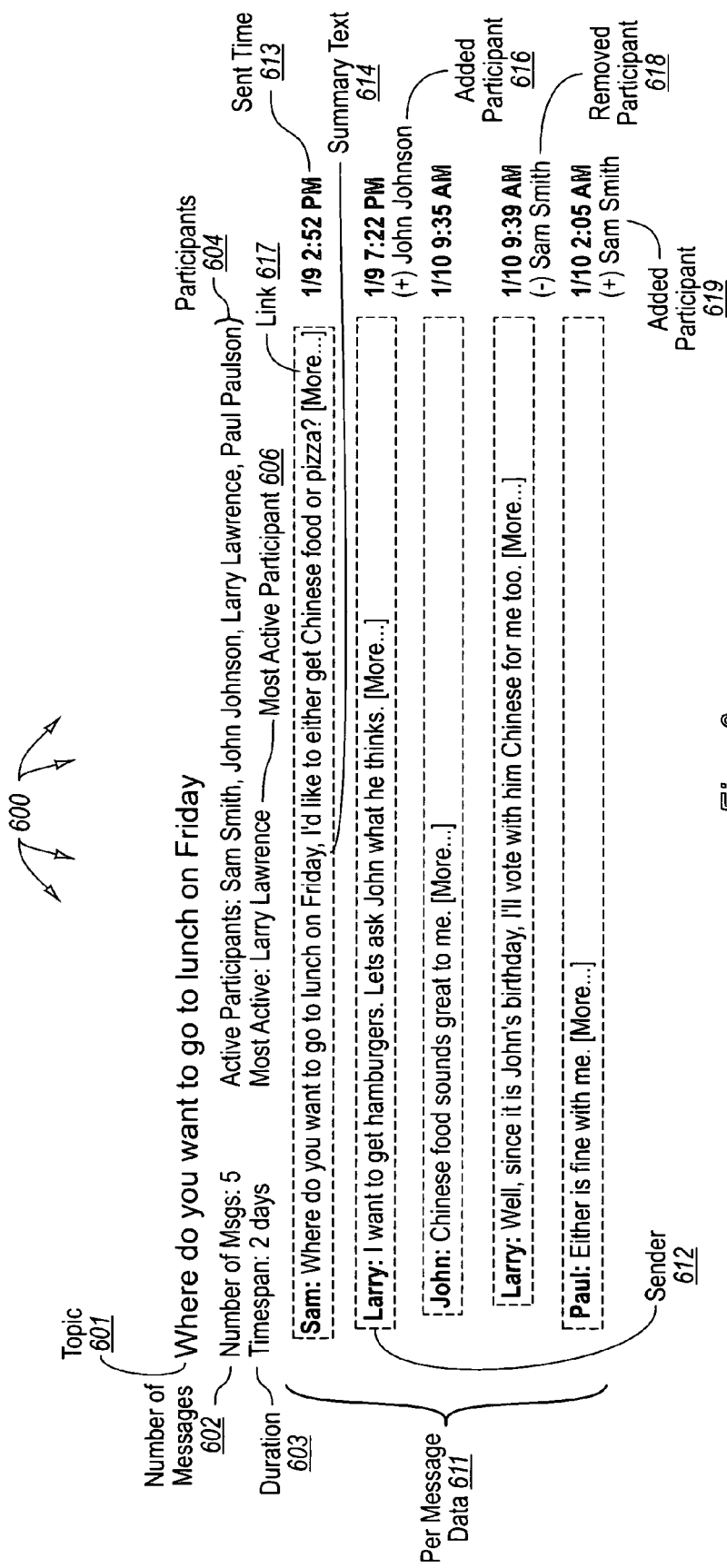
FIG. 6 illustrates an example user-interface screen for presenting message conversation data.

Method 500 includes an act of presenting the retrieved conversation attribute values along with portions of the one or more electronic mail messages (act 504). For example, user-interface 136 can present retrieved attribute values from conversation item 127 along with portions of electronic messages represented by message items 122, 123, and 124. FIG. 6 illustrates an example user-interface screen 600 for presenting message conversation data.

Depicted in user-interface screen 600 are topic 601, number of messages 602, duration 603, participants 604 and most active participant 606. Topic 601 is the topic of the presented electronic mail conversation can be retrieved from Topic field 203. Number of messages 602 indicates the number of electronic mail messages included in the presented electronic mail conversation and can be retrieved from Number Of Messages field 212. Duration 603 indicates the elapsed time span of the presented conversation can be retrieved from Duration field 211. Participants 604 indicate the entities participating in the electronic mail conversation and can be retrieved from Active Participants field 209. Most active participant 606 indicates an entity that has sent the most electronic mail messages included in the presented electronic mail conversation and can be retrieved from Most Active field 207.

Also depicted in user-interface screen 600, is per message data 611. Per message data 611 presents portions of one or more electronic mail messages that are included in the presented electronic mail conversation. For example, a sender (e.g., sender 612) is presented for each electronic mail message included in the presented electronic mail conversation. A sender indicates the entity that sent the corresponding electronic mail message (e.g., message 141) and can be retrieved from a Sender field (e.g., Sender field 223) in a corresponding message item (e.g., message item 221). A summary (e.g., summary text 614) is presented for each electronic mail message included in the presented electronic mail conversation. A summary represents a portion of the body of the corresponding electronic mail message (e.g., message 141) and can be retrieved from a Summary field (e.g., Summary field 224) in a corresponding message item (e.g., message item 221).

A link (e.g., link 617) is presented for each electronic mail message included in the presented the electronic mail conversation. A link provides access to the complete body of the corresponding electronic message (e.g., message 141) and can be retrieved from a link field (e.g., link field 227) in a corresponding message item (e.g., message item 221). A sent time (e.g., sent time 613) is presented for each electronic mail message included in the presented the electronic mail conversation. A sent time indicates the time the corresponding electronic mail message (e.g., message 141) was sent and can be retrieved from a Sent Time field (e.g., Sent Time field 222) in a corresponding message item (e.g., message item 221).

Added participants (e.g., added participant 616 and 619) and removed participants (e.g., removed participant 618) are presented for each electronic mail message included in the presented the electronic mail conversation. Added participants and removed participants can be retrieved from a Recipient Delta field (e.g., Recipient Delta field 228) in a corresponding message item (e.g., message item 221). Thus, when an electronic mail conversation is presented, the entities that received each electronic mail message included in an electronic mail conversation can be identified.

Figure 7:
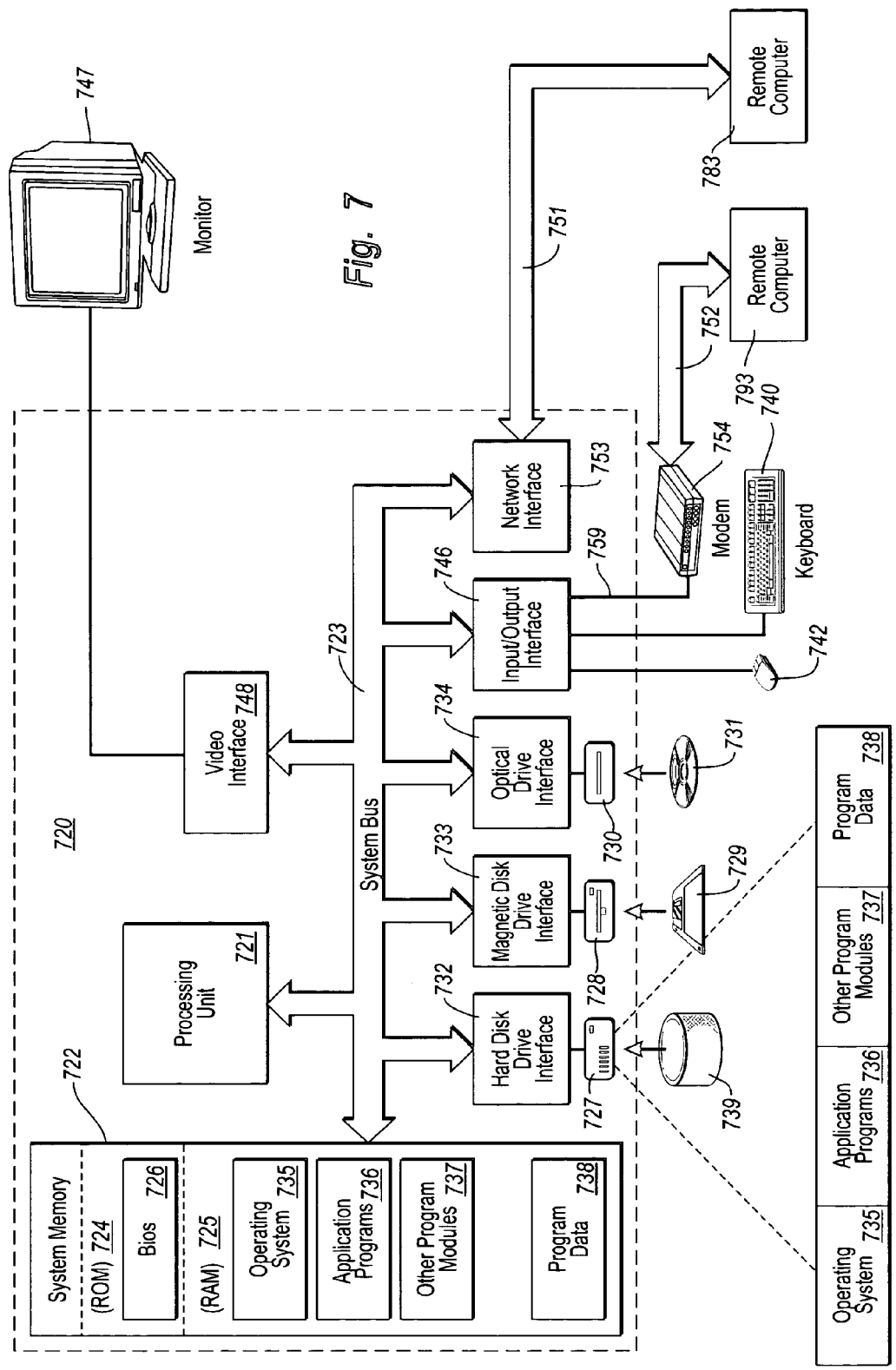
FIG. 7 illustrates a suitable operating environment for the principles of the present invention.

Turning now to FIG. 7, FIG. 7 illustrates a suitable operating environment for the principles of the present invention. FIG. 7 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 7, an example system for implementing the invention includes a general-purpose computing device in the form of computer system 720, including a processing unit 721, a system memory 722, and a system bus 723 that couples various system components including the system memory 722 to the processing unit 721. Processing unit 721 can execute computer-executable instructions designed to implement features of computer system 720, including features of the present invention. The system bus 723 may be any of several types of bus structures including a memory bus or memory controller, a peripheral bus, and a local bus using any of a variety of bus architectures. The system memory includes read only memory ("ROM") 724 and random access memory ("RAM") 725. A basic input/output system ("BIOS") 726, containing the basic routines that help transfer information between elements within computer system 720, such as during start-up, may be stored in ROM 724.

The computer system 720 may also include magnetic hard disk drive 727 for reading from and writing to magnetic hard disk 739, magnetic disk drive 728 for reading from or writing to removable magnetic disk 729, and optical disk drive 730 for reading from or writing to removable optical disk 731, such as, or example, a CD-ROM or other optical media. The magnetic hard disk drive 727, magnetic disk drive 728, and optical disk drive 730 are connected to the system bus 723 by hard disk drive interface 732, magnetic disk drive-interface 733, and optical drive interface 734, respectively. The drives and their associated computer-readable media provide non-volatile storage of computer-executable instructions, data structures, program modules, and other data for the computer system 720. Although the example environment described herein employs magnetic hard disk 739, removable magnetic disk 729 and removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 739, magnetic disk 729, optical disk 731, ROM 724 or RAM 725, including an operating system 735, one or more application programs 736, other program modules 737, and program data 738. A user may enter commands and information into computer system 720 through keyboard 740, pointing device 742, or other input devices (not shown), such as, for example, a microphone, joy stick, game pad, scanner, or the like. These and other input devices can be connected to the processing unit 721 through input/output interface 746 coupled to system bus 723. Input/output interface 746 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even a logically represent a combination of different interfaces.

A monitor 747 or other display device is also connected to system bus 723 via video interface 748. Other peripheral output devices (not shown), such as, for example, speakers and printers, can also be connected to computer system 420.

Computer system 720 is connectable to networks, such as, for example, an office-wide or enterprise-wide computer network, a home network, an intranet, and/or the Internet. Computer system 720 can exchange data with external sources, such as, for example, remote computer systems, remote applications, and/or remote databases over such networks.

Computer system 720 includes network interface 753, through which computer system 720 receives data from external sources and/or transmits data to external sources. As depicted in FIG. 7, network interface 753 facilitates the exchange of data with remote computer system 783 via link 751. Network interface 753 can logically represent one or more software and/or hardware modules, such as, for example, a network interface card and corresponding Network Driver Interface Specification ("NDIS") stack. Link 751 represents a portion of a network (e.g., an Ethernet segment), and remote computer system 783 represents a node of the network.

Likewise, computer system 720 includes input/output interface 746, through which computer system 720 receives data from external sources and/or transmits data to external sources. Input/output interface 746 is coupled to modem 754 (e.g., a standard modem, a cable modem, or digital subscriber line ("DSL") modem) via link 759, through which computer system 720 receives data from and/or transmits data to external sources. As depicted in FIG. 7, input/output interface 746 and modem 754 facilitate the exchange of data with remote computer system 793 via link 752. Link 752 represents a portion of a network and remote computer system 493 represents a node of the network.

While FIG. 7 represents a suitable operating environment for the present invention, the principles of the present invention may be employed in any system that is capable of, with suitable modification if necessary, implementing the principles of the present invention. The environment illustrated in FIG. 7 is illustrative only and by no means represents even a small portion of the wide variety of environments in which the principles of the present invention may be implemented.

In accordance with the present invention, modules including message servers, conversation agents, message clients, and user-interfaces as well as associated data, including message items, conversations items, folder items, electronic mail messages, message conversation commands, and message conversation data may be stored and accessed from any of the computer-readable media associated with computer system 720. For example, portions of such modules and portions of associated program data may be included in operating system 735, application programs 736, program modules 737 and/or program data 738, for storage in system memory 722.

When a mass storage device, such as, for example, magnetic hard disk 739, is coupled to computer system 720, such modules and associated program data may also be stored in the mass storage device. In a networked environment, program modules depicted relative to computer system 720, or portions thereof, can be stored in remote memory storage devices, such as, system memory and/or mass storage devices associated with remote computer system 783 and/or remote computer system 793. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system, a method for updating message conversation data, the method comprising:

an act of receiving an electronic mail message that is to be stored in an electronic mail user's mailbox for subsequent retrieval by the user;

an act of linking the received electronic mail message to a corresponding electronic mail conversation item that represents an electronic mail conversation corresponding to a one or more of a plurality of messages, the electronic mail conversation item including a plurality of conversation attribute values that represent the attributes of the electronic mail conversation including an identification of each message associated with the conversation and corresponding one or more participants of each message and a recipient delta field identifying a list of entities that were added or removed from each message identified as being associated with the conversation;

an act of persisting the link between the received electronic mail message and the corresponding electronic mail conversation item;

an act of changing one or more conversation attribute values to appropriately reflect the attributes of the electronic mail conversation in response to receiving any electronic mail message corresponding to the electronic mail conversation, including the received electronic mail message, and such that the conversation attribute values are responsively updated to at least ensure that every participant in the electronic mail conversation is reflected in the electronic mail conversation item and that any entity added or moved from the electronic mail message is reflected in the recipient delta field;

an act of maintaining a conversations folder in a user's mailbox that includes a plurality of conversation items, wherein each electronic mail conversation item is editable by interfacing with the conversations folder in the user's mailbox, regardless of which folder or folders the electronic mail messages corresponding to the conversation item are stored in, the editing comprising performing a user-initiated operation on an electronic mail conversation item, wherein any user-initiated operations that have been performed are performed automatically on subsequently received electronic mail messages that are determined to be part of the conversation; an act of receiving an indication from the user that the received electronic mail message and any electronic mail messages determined to be part of the conversation are to be ignored;

an act of scanning each of the folders in the user's mailbox for electronic mail messages that are related by subject to the received electronic mail message, wherein scanning includes scanning for both previously sent messages in a sent items folder and scanning for previously received messages in a least one other mailbox folder;

an act of moving the received electronic mail message, any previously sent or received email messages and any subsequently sent or received electronic mail messages identified by the scan as part of the conversation to an ignored conversations folder;

an act of displaying the electronic mail conversation including the conversation's corresponding messages, the displayed conversation including the following in a single application window: a topic header, at least a portion of each message contributed to the conversation including an indication of who sent the message, each message including a URL link to any additional message body text, a participant change indication proximally placed next to each message where a participant was added or removed from the conversation including an identification of the participant who was added or removed, a number of messages indicator indicating the number of messages in the conversation, a timespan indicator indicating how long the conversation has existed, an active participants indicator indicating the participants that have contributed to the conversation and a most active participant indicator indicating the conversation participant that has contributed the most number of messages to the conversation.

2. The method as recited in claim 1, wherein the act of receiving an electronic mail message comprises an act of receiving an electronic mail message that is to be forwarded for delivery to another electronic mail user.

3. The method as recited in claim 1, wherein the act of linking the received electronic mail message to a corresponding electronic mail conversation item comprises an act of storing a URL for the electronic mail message in the conversation item.

4. The method as recited in claim 1, wherein the act of linking the received electronic mail message to a corresponding electronic mail conversation item comprises an act of determining that a GUID in a header of the electronic mail message matches a GUID contained in the conversation message item.

5. The method as recited in claim 1, wherein the act of linking the received electronic mail message to a corresponding electronic mail conversation item comprises an act of linking the received electronic mail message to a data structure that stores per message data for each electronic mail message included in the electronic mail conversation.

6. The method as recited in claim 1, wherein the act of linking the received electronic mail message to a corresponding electronic mail conversation item comprises an act of linking the received electronic mail message in system memory to a corresponding electronic mail conversation item.

7. The method as recited in claim 1, wherein the act of persisting the link between the received electronic mail message and the corresponding electronic mail conversation item comprises an act of storing the link in an item store.

8. The method as recited in claim 7, wherein the act of storing the link in an item store comprises an act of storing a Uniform Resource Locator in an item store.

9. The method as recited in claim 1, wherein the act of persisting the link between the received electronic mail message and the corresponding electronic mail conversation item comprises an act of persisting the link such that the link can subsequently be accessed to access the received electronic mail message.

10. The method as recited in claim 1, wherein the act of changing one or more conversation attribute values to appropriately reflect the attributes of the electronic mail conversation comprises an act of updating data fields in the conversation item.

11. The method as recited in claim 10, wherein the act of updating data fields in the conversation item comprises updating a data field selected from among a most active data field, an active participants data field, a duration data field, and a depth data field.

12. The method as recited in claim 10, wherein the act of updating data fields in the conversation item comprises:
an act of determining that the received electronic message is the first electronic mail message in the electronic mail conversation; and
an act of storing one or more of an ID value, topic value, started by value and start time value in a corresponding data field of the conversation item.

13. The method as recited in claim 1, wherein the act of changing one or more conversation attribute values to appropriately reflect the attributes of the electronic mail conversation comprises an act of adding per message data fields for the received mail electronic message to the conversation item.

14. The method as recited in claim 1, further comprising:
an act of determining the conversation item is included in a Conversations folder.

15. The method as recited in claim 1, further comprising:
an act of creating the conversation item in a Conversations folder.

16. The method of claim 1, wherein message conversation data indicative of a specified conversation is not included in the received electronic mail message.

17. The method of claim 15, further comprising an act of identifying a specified electronic mail conversation for the received electronic mail message by examining the values of one or more message headers to identify an appropriate electronic mail conversation.

18. The method of claim 1, further comprising an act of automatically removing automatically quoted text from any previously sent electronic mail messages.

19. The method of claim 1, further comprising an act of discarding any additional message body text beyond a customizable threshold amount.

20. One or more computer-readable storage devices having stored thereon an electronic mail conversation item data structure, the electronic mail conversation item data structure representing an electronic mail conversation and separate from an electronic mail message, the electronic mail conversation item data structure comprising:
an identifier field storing an identifier value that identifies the electronic mail conversation;
a participants field storing one or more participant values that identify all corresponding participants that are participating in the electronic mail conversation identified by the identifier value stored in the identifier field, and wherein the participants field is responsively updated to appropriately reflect the attributes of the electronic mail conversation whenever an electronic mail message is received that corresponds to the electronic mail conversation, and so as to ensure that every participant associated with the electronic mail conversation is reflected in the electronic mail conversation item;
a message field storing message specific conversation data for each electronic message included in the electronic mail conversation identified by the identifier value stored in the identifier field, the message field comprising:
a recipient delta field storing a recipient delta value that identifiers any difference between recipients of the electronic mail message and recipients of a corresponding parent electronic mail message included in the electronic mail conversation identified by the identifier value stored in the identifier field including recipients that have been added or removed; and
a conversations folder to be implemented in a user's mailbox that includes a plurality of conversation items, wherein each electronic mail conversation item is editable by interfacing with the conversations folder in the user's mailbox, regardless of which folder or folders the electronic mail messages corresponding to the conversation item are stored in, the editing comprising performing a user-initiated operation on an electronic mail conversation item, wherein any user-initiated operations that have been performed are performed automatically on subsequently received electronic mail messages that are determined to be part of the conversation;
wherein an indication is received from the user that the received electronic mail message and any electronic mail messages determined to be part of the conversation are to be ignored;
wherein each of the folders in the user's mailbox is scanned for electronic mail messages that are related by subject to the received electronic mail message, wherein scanning includes scanning for both previously sent messages in a sent items folder and scanning for previously received messages in a least one other mailbox folder;
and wherein the received, electronic mail message, any previously sent or received email messages and any subsequently sent or received electronic mail messages identified by the scan as part of the conversation are moved an ignored conversations folder; and
wherein the electronic mail conversation including the conversation's corresponding messages is displayed in a single application window, the displayed conversation including: a topic header, at least a portion of each message contributed to the conversation including an indication of who sent the message, each message including a URL link to any additional message body text, a participant change indication proximally placed next to each message where a participant was added or removed from the conversation including an identification of the participant who was added or removed, a number of messages indicator indicating the number of messages in the conversation, a timespan indicator indicating how long the conversation has existed, an active participants indicator indicating the participants that have contributed to the conversation and a most active participant indicator indicating the conversation participant that has contributed the most number of messages to the conversation.

21. The one or more computer-readable storage devices having stored thereon an electronic mail conversation item data structure as recited in claim 20, wherein the identifier field comprises:
a globally unique identifier field storing a globally unique identifier value that uniquely identifies the electronic mail conversation such that the electronic mail conversation can be differentiated from other electronic mail conversations.

22. The one or more computer-readable storage devices having stored thereon an electronic mail conversation item data structure as recited in claim 20, the electronic mail conversation item data structure further comprising
    a depth field storing a depth value that represents the nesting depth of reply electronic mail messages included in the electronic mail conversation identified by the identifier value stored in the identifier field.

23. The one or more computer-readable storage devices having stored thereon an electronic mail conversation item data structure as recited in claim 20, the electronic mail conversation item data structure further comprising:
    a duration field storing a duration value that represents the duration of the electronic mail conversation identified by the identifier value stored in the identifier field.

24. The one or more computer-readable storage devices having stored thereon an electronic mail conversation item data structure as recited in claim 20, the electronic mail conversation item data structure further comprising:
    a most active field storing a most active value that identifies a most active participant in the electronic mail conversation identified by the identifier value stored in the identifier field.

25. The one or more computer-readable storage devices media having stored thereon an electronic mail conversation item data structure as recited in claim 20, the electronic mail conversation item data structure further comprising:
    a topic field storing a topic value that identifies the topic of the electronic mail conversation identified by the identifier value stored in the identifier field;
    a started by field storing a started by value that identifies a participant that started the electronic mail conversation identified by the identifier value stored in the identifier field;
    a start time field storing a start time value that identifies at time the electronic mail conversation identified by the identifier value stored in the identifier field was started;
    a most recent field storing a most recent value that identifies a participant that most recently included en electronic mail message in the electronic mail conversation identified by the identifier value stored in the identifier field was started; and
    a number of messages field storing a number of messages value that represents the number of electronic mail messages included in the electronic mail conversation identified by the identifier value stored in the identifier field.

26. The one or more computer-readable storage devices having stored thereon an electronic mail conversation item data structure as recited in claim 20, the electronic mail conversation item data structure further comprising:
    a link field storing one or more link values that link the electronic mail conversation identified by the identifier value stored in the identifier field to one or more electronic mail messages included the electronic mail conversation identified by the identifier value stored in the identifier field.

27. The one or more computer-readable storage devices having stored thereon an electronic mail conversation item data structure as recited in claim 26, wherein the link field comprises:
    a URL field storing one or more URL values that link the electronic mail conversation identified by the identifier value stored in the identifier field to one or more electronic mail messages included the electronic mail conversation identified by the identifier value stored in the identifier field.

28. The one or more computer-readable storage devices having stored thereon an electronic mail conversation item data structure as recited in claim 20, the message field further comprising:
    a sent time field storing a sent time value that represents the time the electronic mail message included in the electronic mail conversation identified by the identifier value stored in the identifier field was sent;
    a sender field storing a sender value that identifies the sender of the electronic mail message included in the electronic mail conversation identified by the identifier value stored in the identifier field;
    a summary text field storing a summary text value that represents a summary of the content of the electronic mail message included in the electronic mail conversation identified by the identifier value stored in the identifier field; and
    a conversation index field storing a conversation index value that represents the position of the electronic message relatively to other electronic messages included in the electronic mail conversation identified by the identifier value stored in the identifier field.

29. The one or more computer-readable storage devices having stored thereon an electronic mail conversation item data structure as recited in claim 20, the message field further comprising:
    a link field storing a link value that links the electronic mail conversation identified by the identifier value stored in the identifier field to the electronic mail message that is included in the electronic mail conversation identified by the identifier value stored in the identifier field.

30. The one or more computer-readable storage devices having stored thereon an electronic mail conversation item data structure as recited in claim 29, wherein the link field comprises:
    a URL field storing a URL value that links the electronic mail conversation identified by the identifier value stored in the identifier field to the electronic mail message that is included in the electronic mail conversation identified by the identifier value stored in the identifier field.

31. The one or more computer-readable storage devices having stored thereon an electronic mail conversation item data structure as recited in claim 20, the electronic mail conversation item data structure further comprising:
    a second message field storing message conversation data for a second electronic message included in the electronic mail conversation identified by the identifier value stored in the identifier field, the second message field comprising:
        a second recipient delta field storing a second recipient delta value that identifies any difference between recipients of the second electronic mail message and recipients of a corresponding second parent electronic mail message included in the electronic mail conversation identified by the identifier value stored in the identifier field.

32. The one or more computer-readable storage devices having stored thereon an electronic mail conversation item data structure as recited in claim 31, the electronic mail conversation item data structure further comprising:
    one or more additional per message fields storing per message conversation data for a corresponding one or more additional electronic messages included in the electronic mail conversation identified by the identifier value stored in the identifier field, each of the one or more additional per message fields comprising:

a corresponding recipient delta field storing a corresponding recipient delta value that identifies any difference between recipients of the corresponding electronic mail message and recipients of a corresponding additional parent electronic mail message that is included in the electronic mail conversation identified by the identifier value stored in the identifier field.

33. The one or more computer-readable storage devices having stored thereon an electronic mail conversation item data structure as recited in claim 32, each of the one or more additional per message fields further comprising:
a corresponding URL field storing a corresponding URL value that links the electronic mail conversation identified by the identifier value stored in the identifier field to a corresponding electronic mail message that is included in the electronic mail conversation identified by the identifier value stored in the identifier field.

34. A computer program product for use at a computer system, the computer program product for implementing a method for updating message conversation data, the computer program product comprising one or more computer-readable storage device having stored thereon computer-executable instructions that, when executed by a processor, cause the computer system to perform the method, the method comprising:
an act of receiving an electronic mail message that is to be stored in an electronic mail user's mailbox for subsequent retrieval by the user;
an act of linking the received electronic mail message to a corresponding electronic mail conversation item that represents an electronic mail conversation corresponding to a one or more of a plurality of messages, the electronic mail conversation item including a plurality of conversation attribute values that represent the attributes of the electronic mail conversation including an identification of each message associated with the conversation and corresponding one or more participants of each message and a recipient delta field identifying a list of entities that were added or removed from each message identified as being associated with the conversation;
an act of persisting the link between the received electronic mail message and the corresponding electronic mail conversation item;
an act of changing one or more conversation attribute values to appropriately reflect the attributes of the electronic mail conversation in response to receiving any electronic mail message corresponding to the electronic mail conversation, including the received electronic mail message, and such that the conversation attribute values are responsively updated to at least ensure that every participant in the electronic mail conversation is reflected in the electronic mail conversation item and that any entity added or moved from the electronic mail message is reflected in the recipient delta field;
an act of maintaining a conversations folder in a user's mailbox that includes a plurality of conversation items, wherein each electronic mail conversation item is editable by interfacing with the conversations folder in the user's mailbox, regardless of which folder or folders the electronic mail messages corresponding to the conversation item are stored in, the editing comprising performing a user-initiated operation on an electronic mail conversation item, wherein any user-initiated operations that have been performed are performed automatically on subsequently received electronic mail messages that are determined to be part of the conversation;
an act of receiving an indication from the user that the received electronic mail message and any electronic mail messages determined to be part of the conversation are to be ignored;
an act of scanning each of the folders in the user's mailbox for electronic mail messages that are related by subject to the received electronic mail message, wherein scanning includes scanning for both previously sent messages in a sent items folder and scanning for previously received messages in a least one other mailbox folder;
an act of moving the received electronic mail message, any previously sent or received email messages and any subsequently sent or received electronic mail messages identified by the scan as part of the conversation to an ignored conversations folder;
an act of receiving a request to present the electronic mail conversation item to the electronic mail user at a user interface;
an act if dynamically generating a hypertext markup language (HTML) body for at least one of the email messages in the conversation item in response to the received request to present the conversation item, the HTML body being generated using at least some of the plurality of conversation attribute values included in the electronic mail conversation item; and
an act of displaying the electronic mail conversation including the conversation's corresponding messages, in a single application window, the displayed conversation including: a topic header, at least a portion of each message contributed to the conversation including an indication of who sent the message, each message including a URL link to any additional message body text, wherein any additional message text beyond a threshold amount is discarded, a participant change indication proximally placed next to each message where a participant was added or removed from the conversation including an identification of the participant who was added or removed, a number of messages indicator indicating the number of messages in the conversation, a timespan indicator indicating how long the conversation has existed, an active participants indicator indicating the participants that have contributed to the conversation and a most active participant indicator indicating the conversation participant that has contributed the most number of messages to the conversation.

35. The computer program product as recited in claim 34, wherein computer-executable instructions that when executed cause the computer system to receive an electronic mail message comprise computer-executable instructions that when executed cause the computer system to receive an electronic mail message that is to be stored in a mailbox for subsequent retrieval by an electronic mail user.

36. The computer program product as recited in claim 34, wherein computer-executable instructions that when executed cause the computer system to link the received electronic mail message to a corresponding electronic mail conversation item that represents an electronic mail conversation comprise computer-executable instructions that when executed cause the computer system to store a URL for the electronic mail message in the conversation item.

37. The computer program product as recited in claim 34, wherein computer-executable instructions that when executed cause the computer system to link the received electronic mail message to a corresponding electronic mail conversation item that represents an electronic mail conversation comprise computer-executable instructions that when executed cause the computer system to determine that a GUID in a header of the electronic mail message matches a GUID contained in the conversation message item.

38. The computer program product as recited in claim 34, wherein computer-executable instructions that when executed cause the computer system to persist the link between the received electronic mail message and the corresponding electronic mail conversation item comprise computer-executable instructions that when executed cause the computer system to store the link in an item store.

39. The computer program product as recited in claim 34, wherein computer-executable instructions that when executed cause the computer system to of change one or more conversation attribute values to appropriately reflect the attributes of the electronic mail conversation comprise computer-executable instructions that when executed cause the computer system to update a data field selected from among a most active data field, an active participants data field, a duration data field, and a depth data field.

40. The computer program product as recited in claim 34, wherein computer-executable instructions that when executed cause the computer system to of change one or more conversation attribute values to appropriately reflect the attributes of the electronic mail conversation comprise computer-executable instructions that when executed cause the computer system to:
  determine that the received electronic message is the first electronic mail message in the electronic mail conversation; and
  store one or more of an ID value, topic value, started by value and start time value in a corresponding data field of the conversation item.

41. The computer program product as recited in claim 34, further comprising computer-executable instructions that when executed cause the computer system to:
  determine the conversation item is included in a Conversations folder.

42. The computer program product as recited in claim 34, further comprising computer-executable instructions that when executed cause the computer system to:
  create the conversation item in a Conversations folder.

\* \* \* \* \*